United States Patent
Puna

[15] 3,643,711
[45] Feb. 22, 1972

[54] TREE HARVESTING MACHINE

[72] Inventor: Erich Puna, Gavle, Sweden
[73] Assignee: Brundell Och Jonsson AB, Gavle, Sweden
[22] Filed: Nov. 26, 1969
[21] Appl. No.: 880,154

[30] Foreign Application Priority Data

Dec. 16, 1968 Sweden................................17203/68

[52] U.S. Cl..............................................144/2 Z, 144/3 D
[51] Int. Cl............................................................A01g 23/02
[58] Field of Search...........144/2 Z, 3 D, 34 R, 34 E, 309 AC

[56] References Cited

UNITED STATES PATENTS

| | | | |
|---|---|---|---|
| 3,238,981 | 3/1966 | Larson et al. | 144/34 R |
| 3,443,611 | 5/1969 | Jorgensen | 144/2 Z |
| 2,527,271 | 9/1970 | Chateauneuf | 144/3 D |

Primary Examiner—Gerald A. Dost
Attorney—Flynn & Frishauf

[57] ABSTRACT

A tree harvesting machine comprising a vehicle carrying a crane. Clamping and cutting means are mounted on a common holder pivotally connected to the outer end of the fore crane arm which can be extended backwards to form a mast, and delimbing means are mounted at the top of the rearmost mast unit.

5 Claims, 2 Drawing Figures

TREE HARVESTING MACHINE

BACKGROUND OF THE INVENTION

The invention relates to a tree harvesting machine of the type in which a crane mounted on a vehicle carries crosscutting and delimbing means.

Machines of this kind have been described in the U.S. Pat. Nos. 3,183,949, 3,183,951 and 3,183,952. An outer arm of the crane is linked to an elongated mast vertical in operating position. A cutting mechanism is mounted at the lower end of the mast and an extension rod carried by the mast in parallel thereto is movable upwards according to the same principle as a Magirus ladder. At the same time as the rod is lifted, a delimbing mechanism moves upwards from the lower to the upper end of the rod so that the branches are removed from a tree which is still held on its place with the butt end located between the crosscutting members.

The known machine has the drawback that the heavy device carried by the crane becomes hard to handle. To obtain a sufficient counter weight it is necessary to have a heavy vehicle chassis which, as a rule, must even be loaded with additional weights at the back to avoid tipping. Such a heavy machine is hard to handle in rough forest country.

SUMMARY OF THE INVENTION

The object of the invention is to provide a tree harvesting machine which is considerably simpler to operate in that the crane can be used for manipulating the trees felled. The vehicle may even be used for removing the tree trunks from the site. In the known manner the machine comprises a vehicle with a frame which carries a two-armed crane mounted to be rotated horizontally, and according to the invention clamping and cutting means are mounted on a common holder which is connected to the outer end of the fore crane arm by a horizontal pivot. Further, the fore crane arm carries a mast assembly adapted to be extended rearwards from the rear end of said arm so as to form an elongated mast together with the forearm, and delimbing means are mounted on the outer end of the mast unit which forms the top of the mast. Such a device is easy to operate. When the clamping members have gripped the tree trunk and the latter has been cut off by cutting or sawing, the pivoted holder of the clamping and cutting means is swung to fell the tree into an inclined position in parallel to and above the forecrane arm, and the delimbing is then carried out by pushing out the mast backwards. By means of the crane the delimbed trunk may be deposited in a suitable place behind or beside the vehicle or preferably on a load bunk provided at the rear end of the vehicle. Conveniently, the forecrane arm is extended some distance backwards beyond the pivot connecting the two arms so that the balance is improved, and for instance the rear arm may be connected approximately to the middle of the fore arm.

DETAILED DESCRIPTION OF THE PREFERRED EMBODIMENT

Figure 1:
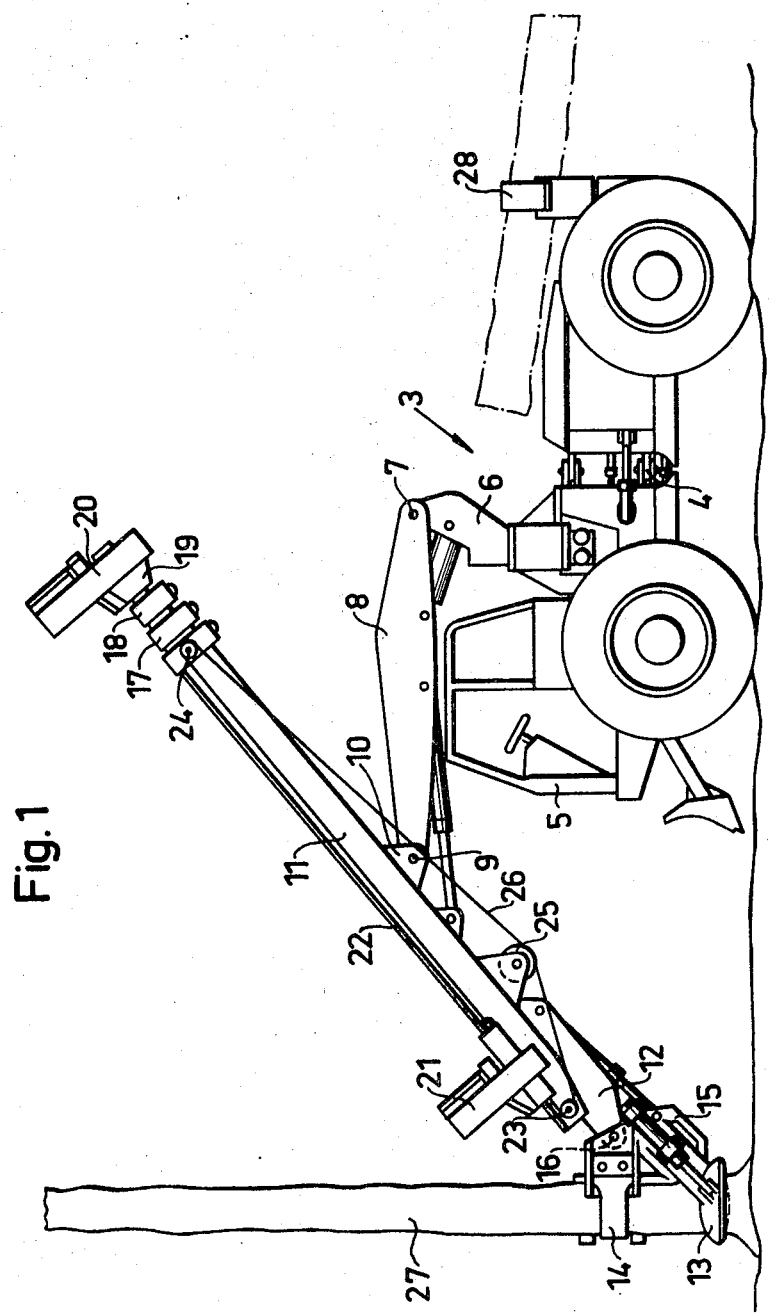
Figure 2:
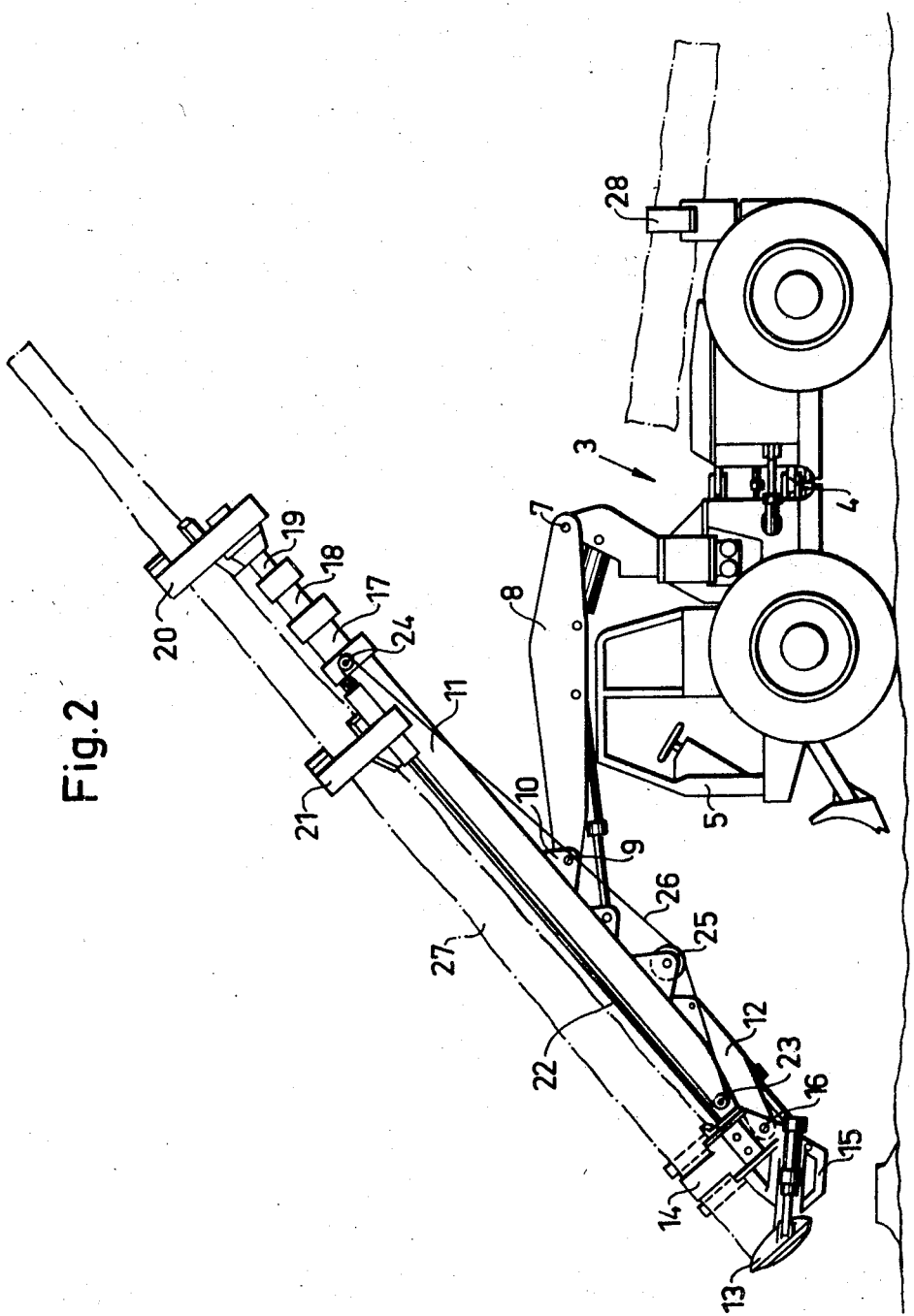

The invention will be described in more detail below with reference to the accompanying drawings, in which:

FIGS. 1 and 2 show side views of the forest harvesting vehicle in two different operating positions.

The vehicle 3 shown in the drawings has an articulated frame consisting of fore and rear sections which are pivotally connected by a vertical link 4 or pivot. The driver's cabin 5 is placed at the front of the fore frame section, and behind the cabin said section carries an upright 6 which is mounted to be rotated horizontally in the usual way. A rear crane arm 8 has one end connected to the upright by a horizontal pivot pin 7, and the opposite end of the arm 8 is by means of a horizontal pivot pin 9 connected to a lug 10 secured approximately at the middle of an elongated tube 11 preferably rectangular or square in cross section. A bracket 12 is secured to one end of the tube 11, and together with the tube portion located at the same side of the pin 9 this bracket serves as a forecrane arm. A cutting mechanism 13 and a gripping mechanism 14 disposed above it are mounted axially in alignment on a common support 15 which is pivotally connected to the bracket 12 by means of a horizontal pivot pin 16. The cutting and gripping mechanisms may be of the design described in U.S. Pat. application No. 703.372, now abandoned in favor of No. 852,521 which issued as U.S. Pat. No. 3,540,501, on Nov. 17, 1970, but of course the invention is not limited thereto, as also other devices having a similar function are quite useful.

The tube 11 which extends rearwardly from the pivot 9 encloses a number of telescoping tube sections 17–19 which may be pushed out rearwardly to form a long mast. The mast assembly need not be described in detail as it may to advantage be of the same structural design as known telescopically extensible booms. The inner or rear tube 19 carries at its outer end a delimbing mechanism 20 which may also be of a construction known per se. Several embodiments of such delimbing means have been described in the U.S. patent specifications mentioned in the introductory part of this specification. Basically, these mechanisms operate such that arcuate edges tools are swung to embrace a tree trunk, whereupon they are moved along the trunk so that branches and twigs are cut off or pulled off.

Conveniently, the tube 11 and the tube sections 17–19 are dimensioned to form a mast of such a length that the delimbing mechanism 20 is enabled to delimb a tree of normal length from a point at some distance from the butt end and at least nearly up to the top of the tree. In many cases the lower part of the tree is almost free from branches, and generally a complete delimbing is not absolutely necessary. However, if a complete delimbing is desired, a supplementary delimbing mechanism 21 of the same kind may be mounted movable along a longitudinal guide 22 at the outside of the tube 11. In the initial position shown in FIG. 1 this latter delimbing mechanism 21 is positioned at the foremost end of the tube 11 (FIG. 2) and back by means of a cable 26 put over two pulleys 23, 24 and a driving pulley 25. In the embodiment shown, a small space is formed between the upper end position of the lower delimber 21 and the lower position of the upper delimber 20, but if desired, this space may be wholly eliminated by mounting the upper delimber on a bracket, not shown, extending rearwards from the outer end of the tube 19.

The hoisting crane as well as the other mechanisms mentioned are preferably operated hydraulically in the known manner. The means required for this operation need not be described.

In FIG. 1, the device described is shown in a position in which the fore crane arm 11, 12 has been moved slightly outwards and the gripping mechanism 14 has gripped the lower part of a tree 27. When the tree has been cut off, the bracket 12 is swung backwards around the pivot 16 to dispose the tree in parallel to the tube 11 within the delimbing mechanisms 20 and 21 which are initially open. The two delimbers 20, 21 are now caused to engage the tree and to keep it clamped, whereupon the lower delimber 21 is moved upwards to delimb the lower part of the tree. In its upper position shown in FIG. 2, the delimber 21 is permitted to remain to assist the gripping mechanism 14 in holding the trunk during the following delimbing operation. Then the telescope tubes 17–19 are pushed out, and the upper delimber 20 removes the branches and twigs from the upper part of the tree. By means of the hoisting crane the delimbed trunk may then be deposited either by the side of the vehicle or in a load bunk 28 provided at the rear of the vehicle. In the latter case a bundle of such trunks may simultaneously be transported to a place of deposit situated at some distance.

It is apparent from the above that claw-shaped delimbing tools may also to advantage be used as gripping members to hold the trunk of the tree. Especially, it is valuable if the lower delimbing mechanism 21 has such a function. In case said lower delimber 21 is omitted it is advisable to mount a stationary gripping mechanism at the rear end of the tube 11.

I claim:

1. A tree harvesting machine comprising a vehicle with a frame, a crane carried by said frame and mounted to be rotated horizontally, said crane comprising a rear arm and a fore arm connected to each other by a horizontal pivot, clamping means adapted to hold a tree and cutting means mounted on a common holder which is connected to the outer end of said fore arm by a horizontal pivot, said cutting means being located a little below said clamping means, said clamping means and said cutting means being positioned closely adjacent the outer end of said fore arm, a telescopically extensible mast assembly carried by the forearm in line with or offset and parallel thereto and adapted to be extended rearwards from the rear end of said forearm so as to form an elongated mast together with the forearm and delimbing means mounted on the outer end of said mast, said delimbing means also functioning to at least partially cradle the space adjacent thereto in the direction of said clamping means and thereby adapted when said clamping means holds a tree, to at least partially cradle and hold said tree.

2. A tree harvesting machine as claimed in claim 1, in which said rear crane arm is pivotally connected about to the middle of said forecrane arm.

3. A tree harvesting machine comprising a vehicle with a frame, a crane carried by said frame and mounted to be rotated horizontally, said crane comprising a rear arm and a forearm connected to each other by a horizontal pivot, clamping means adapted to hold a tree and cutting means mounted on a common holder which is connected to the outer end of said forearm by a pivot parallel to the horizontal pivot connecting said rear and forearms, said cutting means being located a little below said clamping means, a telescopically extensible mast assembly carried by the forearm in line with or offset and parallel thereto and adapted to be extended rearwards from the rear end of said forearm so as to form an elongated mast together with the forearm, first delimbing means mounted to be moved along the fore crane arm to delimb the lower portion of a tree, and second delimbing means mounted on the outer end of said mast to delimb the tree beyond the rear end of said forecrane arm, said delimbing means also functioning to at least partially cradle the space adjacent thereto in the direction of said clamping means and thereby adapted, when said clamping means holds a tree, to at least partially cradle and hold said tree.

4. A tree harvesting machine as claimed in claim 3 wherein said first delimbing means is positioned at the end of said forearm adjacent said clamping means and is adapted to move from said position toward the other end of said forearm when delimbing and wherein said clamping means and said cutting means are positioned closely adjacent the said outer end of said fore arm.

5. A tree harvesting machine as claimed in claim 4, in which said rear crane arm is pivotally connected about to the middle of said fore crane arm.

* * * * *